United States Patent
Townsley

[19]

[11] 3,781,096

[45] Dec. 25, 1973

[54] METHOD AND APPARATUS FOR DESIGNING CONTACT LENSES

[75] Inventor: Malcolm G. Townsley, Park Ridge, Ill.

[73] Assignee: Wesley-Jessen, Inc., Chicago, Ill.

[22] Filed: Nov. 1, 1972

[21] Appl. No.: 302,777

[52] U.S. Cl. .................... 351/13, 351/16, 351/40, 356/156
[51] Int. Cl. ...... A61b 3/10, A61b 3/14, G01b 11/24
[58] Field of Search ........................ 351/1, 6, 7, 13, 351/16, 39, 40; 356/156

[56] References Cited
UNITED STATES PATENTS
R27,475  9/1972  Volk .................................. 351/13 X Primary Examiner—Paul A. Sacher
Attorney—Dean S. Edmonds et al.

[57] ABSTRACT

A method and apparatus for the design of contact lenses is disclosed wherein the contour of a patient's cornea is measured to generate a curve representing the contour of the cornea. With the desired bearing diameter of the contact lens and the apical clearance known along with the generated ellipse which represents the cornea contour, the base curve of the contact lens is computed which curve describes the interior surface of the optical zone of the contact lens. The intermediate, or bearing curve is then computed to parallel the curvature of the cornea such that the intermediate curve bears against the surface of the cornea, and finally the peripheral curve is computed based on the edge clearance and thickness desired. The design of the contact lens is completed by computing the front curve of the lens based on the prescription.

10 Claims, 9 Drawing Figures

$$\Delta S = (C_{n+1} - C_n) \, TAN\,[(\psi_{n+1} + \psi_m)/2]$$

METHOD AND APPARATUS FOR ASSIGNING CONTACT LENSES

BACKGROUND OF THE INVENTION

This invention relates to a method and apparatus for designing contact lenses and more specifically relates to a method and apparatus for automatically generating the dimensions of a corneal contact lens such that it accurately and comfortably fits the contour of the patient's cornea while at the same time being of the desired optical prescription.

The shape of the human cornea has been of interest for many generations with many techniques having been devised for determining the topography of the cornea. Most of the prior art techniques for defining the shape of the cornea have fallen short of the accuracy required for fitting a contact lens to the cornea with the result that some users suffer discomfort due to improper fitting. Prior instruments for measuring the cornea have included the keratometer, the moire keratometer and the interferometer, and have included such techniques as stereophotogrammetry, profile photography and photokeratoscopy. However, none of these methods have been able to describe the corneal contour beyond the fact that it is aspherical and that its curvature is reduced as it progresses away from the apex thereof toward the limbus.

The keratometer is widely used but is a less than adequate means for determining the contour of the cornea since it defines only two points on the surface of the cornea from which the entire shape of the cornea must be determined. Accordingly, the keratometer is a relatively inaccurate means for determining the corneal profile or for determining with accuracy the dimensions of a corneal contact lens that will best fit such profile.

Much of the early investigative work involved the development of photokeratoscopy. The early efforts at accurately deriving the corneal contour through photokeratoscopy were hindered, however, because the virtual image of the reflected target rays was not in a flat plane. This problem was solved by the photoelectronic keratoscope designed by Malcolm Townsley and described in U.S. Pat. No. 3,598,478. However, even with the improved photoelectronic keratoscope, a critical problem has always been the translation of the keratograph data into a detailed profile of the corneal surface with any degree of speed and repeatable precision, and even more importantly, utilizing such data to accurately manufacture corneal lenses which will properly fit the patient while at the same time having the proper optical prescription.

SHORT STATEMENT OF THE INVENTION

This invention provides an improved method and apparatus for the design of contact lenses wherein the steps of defining the lens contour are performed automatically with relative ease at high speeds and results in the design of a contact lens which will accurately and comfortably fit the cornea.

More specifically, this invention relates to a method and apparatus for measuring the contour of the cornea of a patient's eye and then developing the dimensions of a corneal contact lens which will fit the measured contour. The apparatus includes a means for directing light from a series of target rings toward the cornea of the eye. A virtual image of the target rings is formed by the reflection of the light from the cornea. This virtual image lies behind the cornea with the spacing of the rings being determined by the geometry of the target and topography of the corneal surface. A means is provided for measuring the distances between the rings of light along at least one meridian. The measured distances are coupled to a means for converting the distances into points which substantially define the intersection of the meridian and the target rings of light on the cornea. A means is provided for generating a curve which fits the points which curve best defines the corneal curve. Means for deriving at least three points for defining a base curve is provided. Two of the points are at the intersection of the generated curve and the chord representing the bearing diameter of the contact lens. The other point is located at a distance from the apex of the generated curve equal to the apical clearance. A curve generating means derives the arc of the circle which passes through these three points which arc is the base curve. A means for generating the intermediate curve of the contact lens derives at least one point on the outer edge of the intermediate curve which is at a distance from the major axis equal to one half the diameter of the peripheral zone. The intermediate curve generating means then generates the curve that will pass through the aforementioned derived point and the outer edge of the base curve. To complete the inner contour of the contact lens, a means for generating the peripheral curve derives at least one point outside of the intermediate curve having a predetermined spacing from the generated corneal curve. The peripheral curve generating means then develops the curve which passes through the aforementioned point and the outer edge of the intermediate curve. The design of the lens is completed by generating a front curve in accordance with the patient's prescription.

BRIEF DESCRIPTION OF THE DRAWINGS

Other objects, features, and advantages of this invention will become more fully apparent from the following detailed description, appended claims, and the accompanying drawings in which:

DETAILED DESCRIPTION OF THE PREFERRED EMBODIMENT

Figure 1:
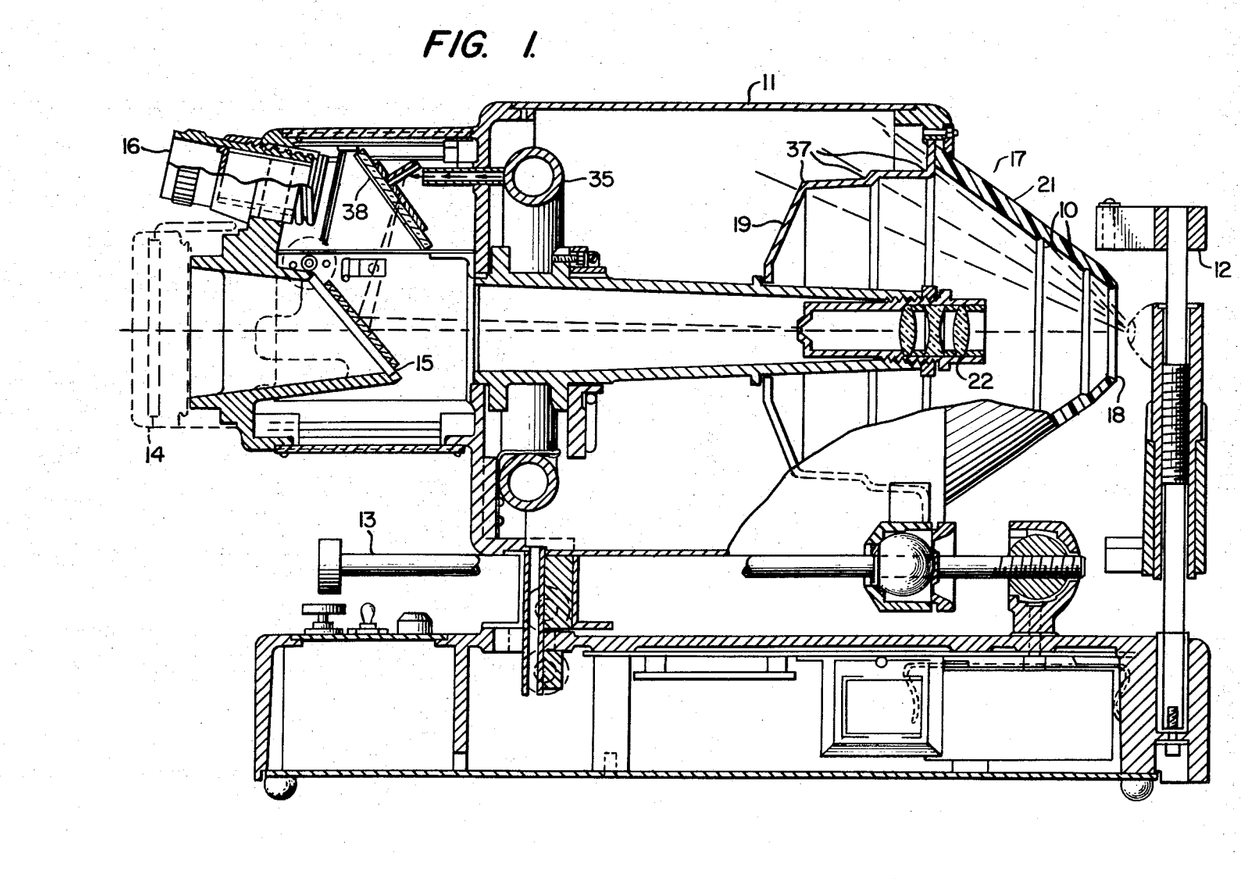
FIG. 1 is a side elevation view of a photoelectronic keratoscope.

Refer now to FIG. 1 of the drawings which is a sectional side elevation view illustrating a photoelectronic keratoscope. The photoelectronic keratoscope includes the following primary parts; the lamp house body 11 including a target chamber 17, the head rest 12, the control arrangement 13, the film holder 14, the shutter 15, and an eye piece 16. The target of the camera occupies the interior of a hollow enclosure 17 which has a small opening 18 into which the eye of a patient is positioned. The target is constructed of two transparent shells 19 and 21 which are mounted to the lamp house 11. The front shell 21 of the target chamber 17 which forms the closure of the lamp housing 11, is aluminized on the face thereof directed toward the lamp 35. This aluminum is covered with dull black paint.

Target rings 37 are cut through the aluminum and paint on rear shell 19 so as to be illuminated by light transmitted from lamp 35 through the lamp housing 11 as shown in the Figure. The rear shell 19 of the target chamber is aluminized with the interior face thereof having a coating of dull black paint. Target rings 10 are machined at appropriate steps in the interior of target housing 21 to provide a target shape which will produce a virtual image in a flat plane and to provide equally spaced rings in the image if the reflecting surface, i.e., the eye, is a sphere. The light from the lamp 35 passes through the target rings 37, strikes the cornea of the eye and is reflected through a series of lenses 22 onto a suitable film positioned behind shutter 15. The light impinging on the film will be in the form of a series of concentric rings which are spaced apart depending upon the topography of the cornea, and the geometry of the target rings.

The cornea is aligned with the lenses 22 by means of a ray of light from lamp 35 which is directed through a hole in mirror 38 and reflected from the mirror on the back of shutter 15 through lenses 22 to the cornea. The ray is reflected back through the lenses 22 and is reflected both by the mirror on the back of shutter 15 and mirror 38 into eye piece 16. When the ray is centered on the cross hairs of the eye piece, the axis of the cornea is aligned with the lenses 22. A more detailed description of the structure and operation of the photoelectronic keratoscope may be found in U.S. Pat. No. 3,598,478 issued to Malcolm G. Townsley. While the photoelectronic keratoscope is utilized in the preferred embodiment, other suitable means for measuring the contour of the cornea may be utilized in accordance with the subject invention.

Figure 2:
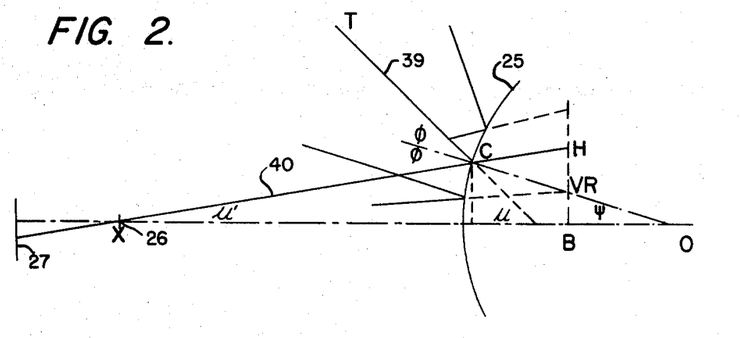
FIG. 2 is a diagram of the image geometry for deriving the relationships required for determining the contour of the cornea.

Refer now to FIG. 2 which is a cross-sectional view of the cornea of the eye showing light from the target rings impinging thereon. The cornea of the eye is shown schematically by the line 25 which as shown is spherical in shape for the purpose of deriving the equations necessary for determining the contour of the cornea but which more generally takes the form of a conic section such as an ellipse, parabola, or hyperbola. The analysis of a very large number of corneas has indicated that most corneas, on any given meridian, are described by an ellipse and that the elliptical shapes differ in several meridians so that the corneal shape is a toric ellipsoid or an elliptical toroid. Light rays from the target rings are directed toward the cornea of the eye and when reflected, the rings form a virtual image which lies in the space behind the corneal surface according to the well known optical laws for the formation of reflected images. The reflected light is directed toward a lens 26, shown schematically as a composite of the lenses 22 of the photoelectronic keratoscope, as though the light rays had originated from the virtual image. In three dimensional space, rays from the target rings describe a plurality of concentric truncated cones between the target and the cornea of the eye and between the cornea and the lens 26. However, for ease of description only a series of single rays of light are shown in the figure which rays lie in a plane section through the axis OX.

For the purpose of deriving the appropriate geometric relationships for generating the topography of the eye, the path of a light ray 39 will now be examined in detail. The ray 39 emanates from target T and is directed toward a vertex point C on the cornea of the patient's eye. The ray is then reflected from the cornea through lens 26 onto a film 27 or other appropriate recording medium. The image plane is shown positioned behind the vertex point C and includes the point H where the line of the reflected light 40 extends back and meets the image plane. The vertex radius VR has a length equal to the distance from the vertex C to the point O where the normal to the surface at C insects the axis of the cornea OX. $\psi$ is the angle which the vertex radius makes with the axis OX and the angle $\mu$ is the angle which the target ray makes with the axis OX. The angle $\mu$ is determined from the geometry of the target since the distance from T to the axis OX is known and the angle that the incident ray 39 makes with the perpendicular to the axis OX is known. The location of the target point T is known by its distance from the axis OX and by the distance parallel to the axis OX from the point X. The keratoscope is adjusted so that the virtual image formed by reflection of the target on the cornea is in the front focal plane of lens 26. This results in placing the cornea at a quite closely known distance from the lens 26, so that the angles $\mu$ subtended by the target rings are completely defined by the geometry of the target and the location of the front focal plane of lens 26.

The distance XB is the short conjugate of the camera system and is known from the calibration of the camera. The distance BH is the distance measured in the photograph multiplied by the magnification factor of the photoelectronic keratoscope. The target design gives a distance from the intercept O to the focal plane B of 3.7 VR/7.7 from which OX the distance from the lens 26 to the intercept O can be computed. Then the angle $\mu'$ can be found by the following formula:

$$\mu' = \tan^{-1} BH/XB \quad (1)$$

The angle $\phi$ is then given by the following formula:

$$\phi = (\mu + \mu')/2 \quad (2)$$

Where $\phi$ is the angle between the incident target ray 39 and the extension of the vertex radius VR.

The vertex radius VR can now be computed by the following formula:

$$VR = OX (\sin \mu'/\sin \phi) \quad (3)$$

The angle $\psi$ which the vertex radius makes with the axis OX is given by the following formula:

$$\psi = (\mu - \mu')/2 \quad (4)$$

With $\psi$ known and the vertex radius VR known, the semichord length from the axis OX to the vertex C can be computed by the following formula:

$$C = R \sin \psi \qquad (5)$$

A plurality of such semi-chords $C(1)$ through $C(n)$ can be computed, one for each light ring emanating from the target sources 37. As will be described, the distance between the rings of light reflected from the cornea may be measured at more than one meridian or may be measured along a line orthogonal to the meridian in which case a correspondingly increased number of semi-chord lengths can be computed. In general, as the separation of the various reflected rings of light are measured over additional meridians, the accuracy of the computed corneal contour will increase.

Figure 3:
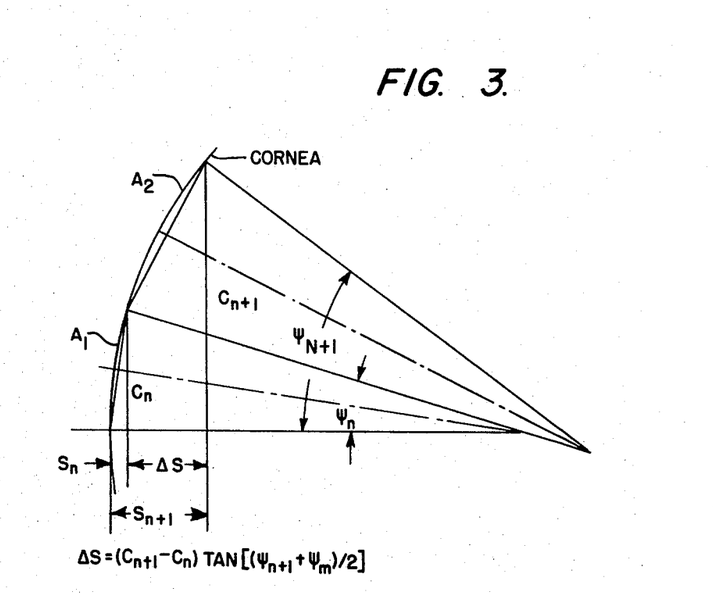
FIG. 3 is an illustrative diagram for deriving the sagittal distances from the apex of the cornea to various chords cutting across the corneal curve.

At this point the displacement of each of the chords along the axis $OX$ of the cornea is unknown. This information is necessary in order to properly position the semi-chords such that the ends thereof define a plurality of points on the corneal curve. To compute these sagitta, an assumption is made that the cornea has a smooth, regular shape without any abrupt changes in the radii of curvature. A second assumption is made that a corneal profile can be built up from circular elements extending from one known point to another such that the circular elements are tangent to each other at the respective points. Refer now to FIG. 3 which is a diagram of a corneal model for determining the sagittal distances from the apex of the cornea to the respective points at which the target rings of light are reflected from the cornea. In order to compute the sagitta, the arcs $A_1, A_2, \ldots$, are drawn as shown. Starting from the vertex of the cornea where the semi-chord $C(0)$ equals zero and the angle $\psi(0)$ equals zero, the successive sagittal distances can be derived from the following formula:

$$S(n) - S(n-1) = [C(n) - C(n-1)] [\tan (\psi(n) + \psi(n-1))]/2$$

Thus, as an example, is semi-chords $C(1)$ and $C(2)$ are any two adjacent chordal heights and $\psi(1)$ and $\psi(2)$ are the corresponding slope angles, then the sagittal contribution of arc $A_1$, that is, $S(2) - (S1)$, is given by the following formula:

$$S(2) - S(1) = [C(2) - C(1)][\tan (\psi(2) - \psi(1)/2 \qquad (7)$$

The separate sagittal dimensions $S(n)$ can then be formed by summing the contribution of the individual zones $S(n) - S(n-1)$ from $S(l)$ to $S(n)$.

With the sagittal distances and the semi-chord heights known, the coordinates of a plurality of points representing points on the cornea can be obtained.

The equation of the curve which best defines the contour of the cornea can be generated by any suitable technique, such as, the Method of Least Squares or the Gauss-Sidell iterative method. By either method an ellipse is generated which best fits the points. The general equation for an ellipse, circle, parabola or hyperbola is:

$a x^2 + bxy + cy^2 + dx + ey + g = o$

The solution found by either the Gauss-Sidell method or the Method of Least Squares gives the values of the coefficients $a, b, c, d, e$, and $g$ for this equation.

Figure 4:
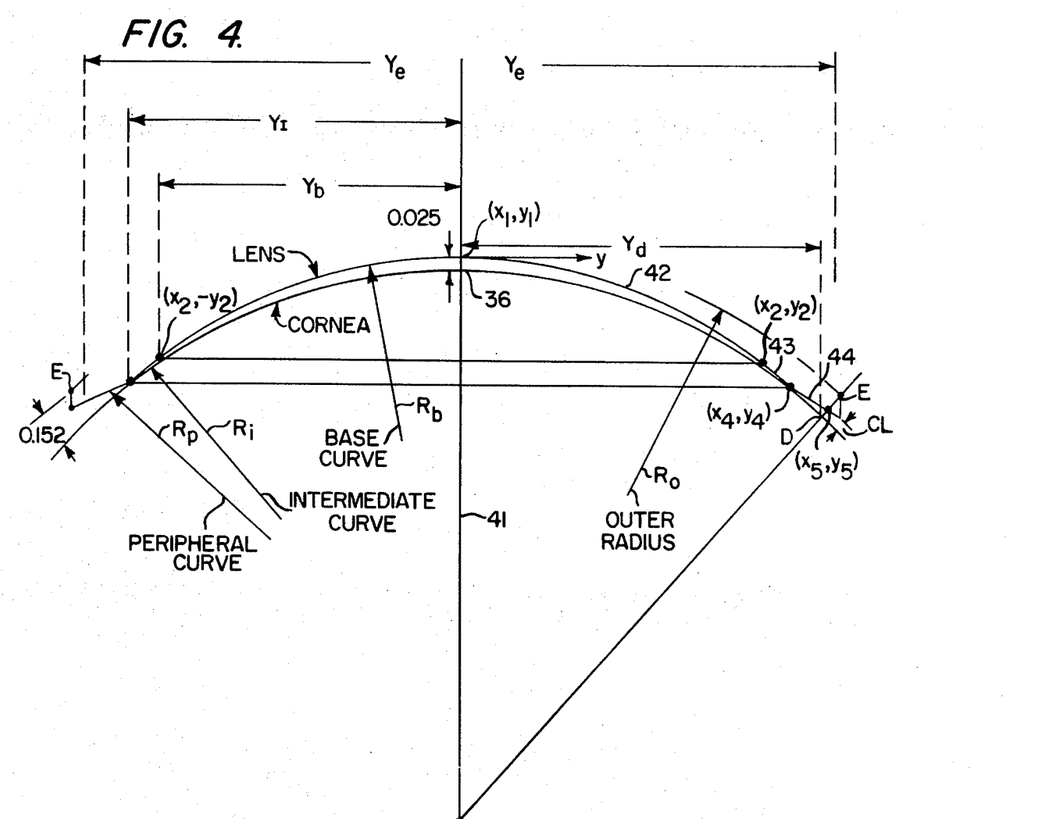
FIG. 4 is a cross-sectional view of the contact lens produced in accordance with the techniques of this invention.

Refer now to FIG. 4 which is a section view of the contact lens positioned adjacent the generated corneal curve. The surface of the cornea has an elliptical shape with the apex 36 thereof positioned at the end of the major axis 41 of the ellipse. The interior surface of the contact lens includes a base curve 42 which defines an optical zone. The base curve is separated from the cornea along the major axis 41 by a predetermined distance called the apical clearance, such as 0.025 mm. The base curve touches the corneal curve at the bearing diameter which has a semi-chordal length of $Y_b$. This separation of the lens and cornea permits the formation of a tear layer therebetween which separates the lens from the cornea so that the lens will not rest on the cornea at the visual axis. The contact lens is contiguous with the cornea over an intermediate curve 43 called the bearing zone. This portion of the lens supports the contact lens on the cornea and is typically 0.3 mm wide. The intermediate curve may have an edge lift of up to 0.005 mm if desired. The peripheral curve 44 defines the peripheral zone of the contact lens and lifts away from the cornea in order to permit a tear layer to form under the lens. The peripheral curve is also 0.3 mm wide and has a lift, CL, of 0.05 mm from the cornea at its outer edge. The location of the outer edge E of the front face of the lens is set at a predetermined distance from the corneal curve which distance may be, for example, 0.152 mm.

In order to generate the base curve, the diameter of the optical zone must be determined. This is accomplished by choosing a lens diameter based on the experience of the practioner who is fitting the lens, or on a rule which relates the lens diameter to the vertex radius VR. The bearing diameter is then set as a fixed value, usually 1.2 mm less than the outer diameter of the lens, and the value $y_b$ is equal to half the bearing diameter. This value $y_b$ is inserted into the equation for the corneal curve to find the co-ordinates of the point where the bearing diameter intersects the corneal curve. Since the corneal curve is often not symmetrical about the visual axis, or the axis OX, the values $(x_1, y_b)$ and $(x_3, -y_b)$ are found. The x axis coordinates can then be computed. The coodinates of the point on the interior surface of the optical zone of the lens is easily determined since the $x$ coordinate is zero and the $y$ coordinate is equal to the apical clearance. It is well known that three points will define a circle and accordingly, by substituting the coorindate values for the aforementioned three points into the following equation, three sets of simultaneous equations are provided which when solved give the coordinates of the center of the base curve along with the base radius:

$$(x - X)^2 + (y - Y)^2 = R^2 \qquad (8)$$

where $X$ is the $x$ axis coordinate of the center of the base curve, $Y$ is the $y$ axis coordinate thereof and $R$ is the base radius.

The intermediate or bearing zone curve is generated in a manner similar to that of the base curve. From the figure the points $(x_1, y_b) + (x_2, -y_b)$ at which the base curve intersects the intermediate curve are known. Since the width of the intermediate zone is typically set at 0.3 mm, this value is added to one-half the bearing diameter, i.e., $(0.3 + y_b)$, to give the y axis coordinate $y_4$ of the outer edge of the intermediate curve. The intermediate curve may be parallel to the corneal curve or it may be slightly raised from the cornea at its outer edge. In either case the x axis coordinate can be derived by first substituting the y axis coordinate value $y_4$ into the derived equation for the corneal curve. This gives the x axis coordinate $x_4$ is the bearing zone curve is exactly parallel to the cornea. If a lift is desired, the value of the lift, e.g., 0.005 mm, is subtracted from the x axis coordinate $x_4$ to give the x axis coordinate $x_4'$ of the point on the outer edge of the intermediate curve. As before the three points $(x_2, y_b)$, $(x_3, -y_b) + (x_4, y_4)$ when substituted into equation (8) provides three simultaneous equations which when solved gives the coordinates of the center of the intermediate curve along with the radius $R_i$ of the intermediate curve.

Figure 5:
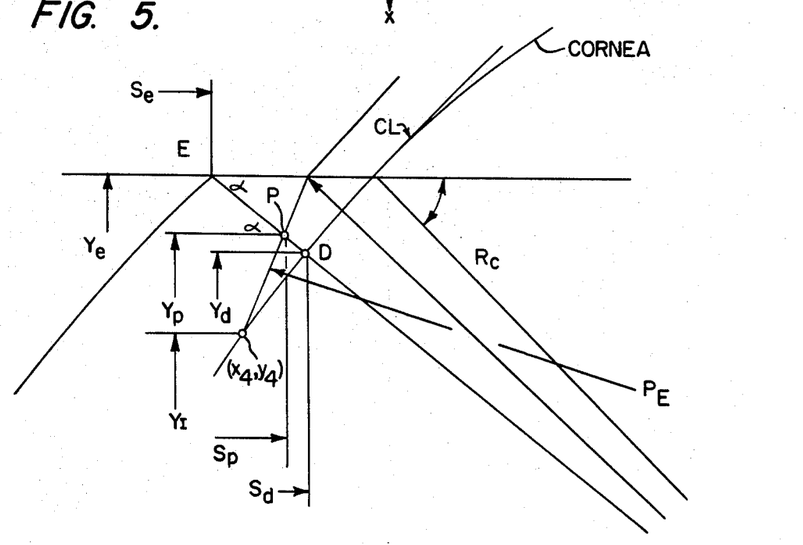
FIG. 5 is a cross-sectional view of the contact lens produced in accordance with this invention showing the construction of the peripheral curve thereof.

Referring to FIG. 5, the method of generating the peripheral curve will now be described. An edge lift is desired at the edge of the contact lens in order to form a wedge shaped tear layer in the peripheral zone. Accordingly, the peripheral curve lifts away from the cornea as shown in the figure. In addition, the location of the outer edge E of the front surface with respect to the cornea must be set such that the eye lid will not be unduly irritated by its movement over the lens. The edge lift and the edge thickness, i.e., the distance EC from the cornea to the point E, are measured along the normal to the cornea at the point C. Since the point E at the outer edge of the front surface is measured with respect to the corneal curve, the direction of the normal at point C must be calculated. To do this the slope at the intercept of the corneal curve and the chord $y_e$ which correspondes to the outside diameter of the lens is determined by the following formula:

$$S = q\,(a - x)/y \tag{9}$$

where $S$ is the slope, $q$ is equal to $1-e^2$ where e is the eccentricity of the ellipse and a is the semi-major axis. The intersection of the normal $R_c$ with the major axis can then be computed. The distance to the point of intersection of the axis, i.e., the length of $R_c$, is the corneal radius at the outside diameter of the lens. The semi-chord $y_c$ to the intersection of the normal from the outer edge E to the corneal curve is approximately given by $$y_d = y_e\,[R_c/(R_c + t)] \tag{10}$$

where $y_e$ is the semi-chord to the external surface of the lens and t is a predetermined constant and t is the edge thickness EC which typically is set at 0.152 mm. The sagittal distance $S_d$ from the apex of the ellipse to the point on the corneal curve where the semi-chord $y_d$ meets the curve is computed by substituting the value $y_d$ into the equation for the ellipse.

The point P on the inner surface of the corneal curve is next determined. The angle which the normal to the ellipse at the point C makes with the major axis of the corneal curve is approximately given by the following formula:

$$\alpha = \sin^{-1}\,(y_d/R_c) \tag{11}$$

The semi-chord $Y_p$ to the point P is then given by the following formula:

$$Y_p = y_d + Cl\,\sin\alpha \tag{12}$$

where $Cl$ is the desired edge lift. The sagittal distance from the apex of the ellipse to the point $P$ which gives the x axis coordinate thereof is computed by the following formula:

$$S_p = S_d - Cl\,\cos\alpha \tag{13}$$

The radius of the peripheral curve can then be determined by solving equation (8) for the radius by substituting the coordinates $(x_5, y_5)$ of point $P$, and points $(x_4, y_4)$, and $(x_4, -y_4)$ into the equations.

The coordinates $x_6, y_6)$ of the outer edge E are now determined. The value $y_6$ is equal to the semi-chord $y_e$ which is given. The sagittal distance $S_e$ gives the x axis coordinate of the point E. This value is computed by the following formula:

$$S_e = S_d - t\,\cos\alpha \tag{14}$$

The location of the edge point E on the front surface of the lens is the starting point for the design of the front surface. The front surface of the lens can then be computed based on the thickness of the lens as dictated by the prescription.

Figures 6, 9:
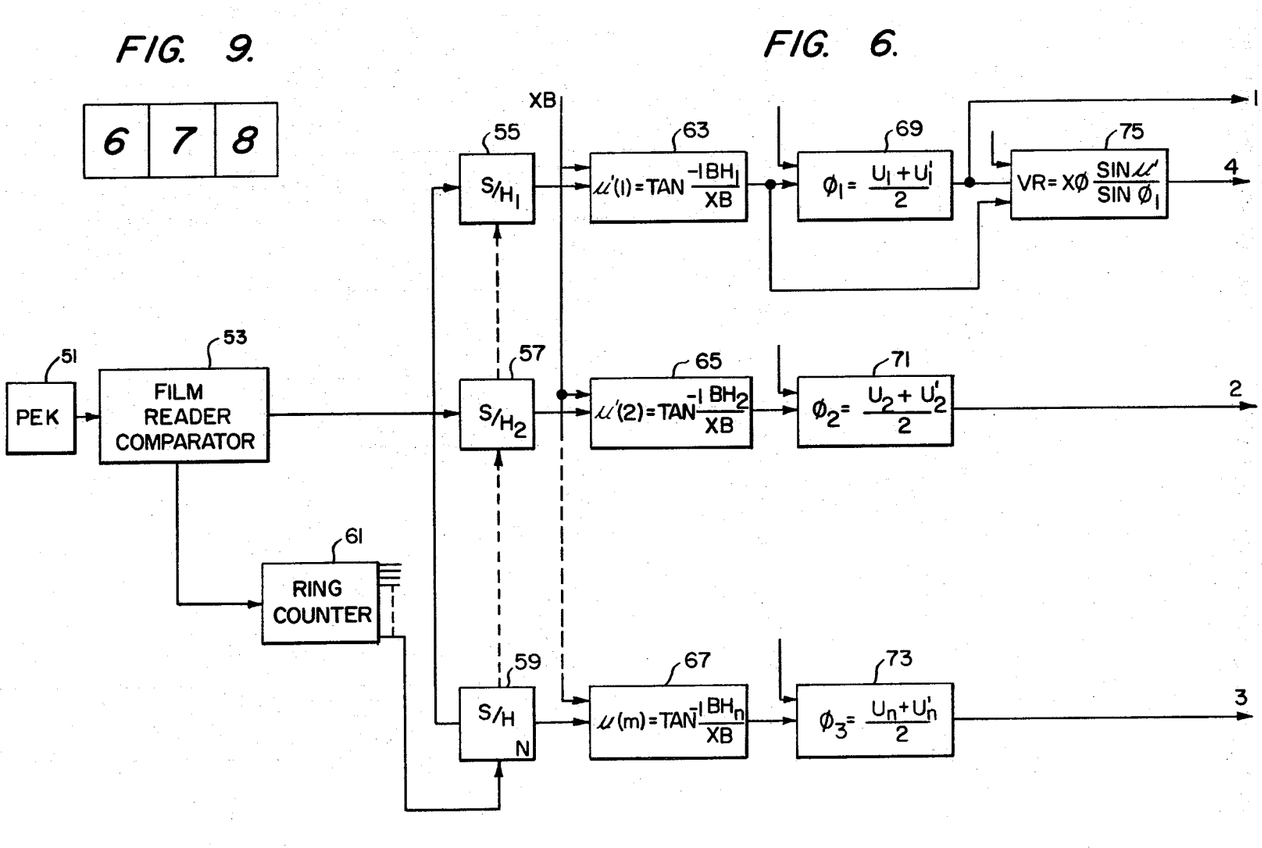
FIG. 6 is a simplified schematic block diagram of a method and apparatus for determining the topography of the cornea.
FIG. 9 is a block diagram showing the interrelationship of FIGS. 6, 7 and 8.
Figure 7:
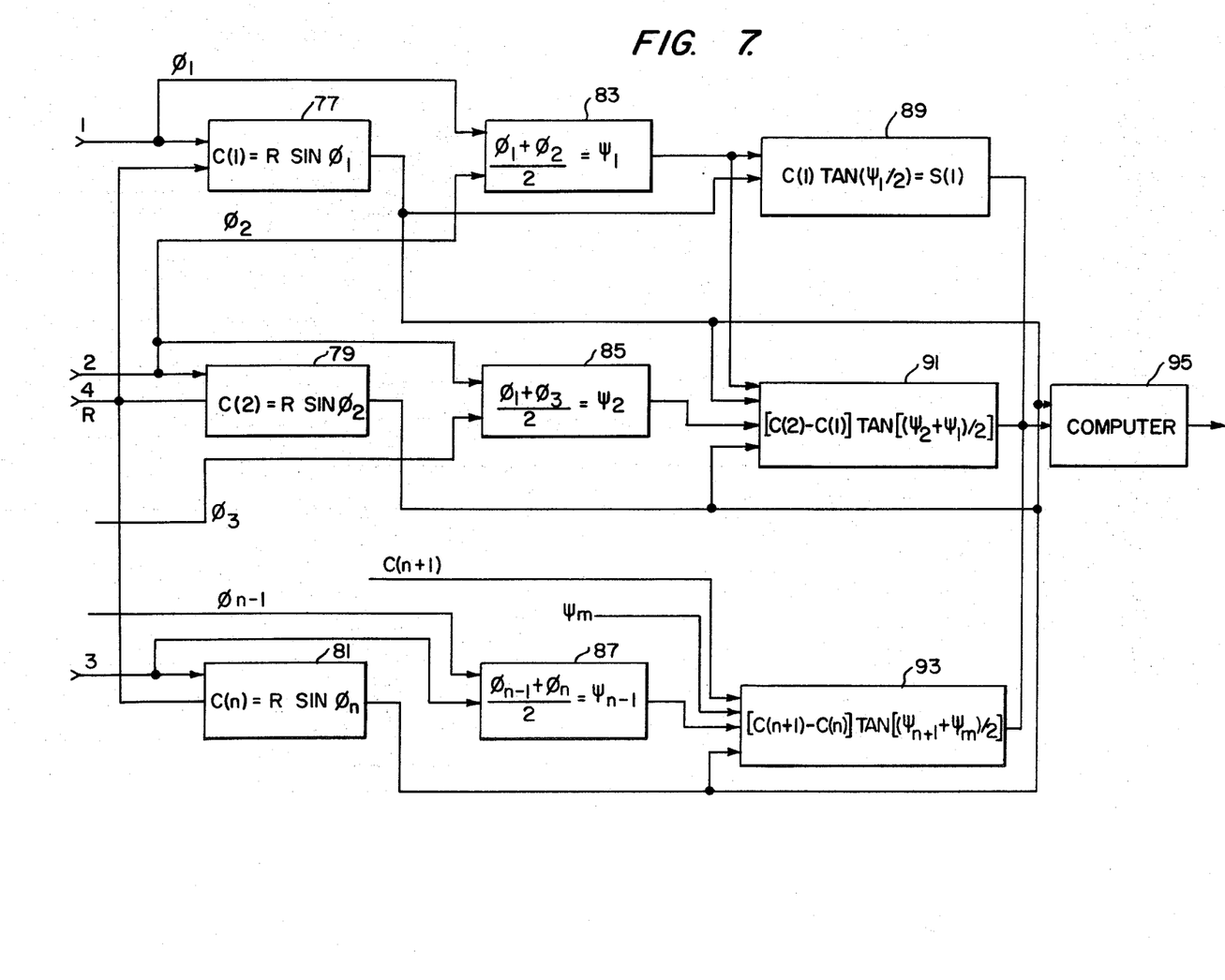
FIG. 7 is a simplified block diagram of a method and apparatus for determining the topography of the internal contour of a contact lens.
Figure 8:
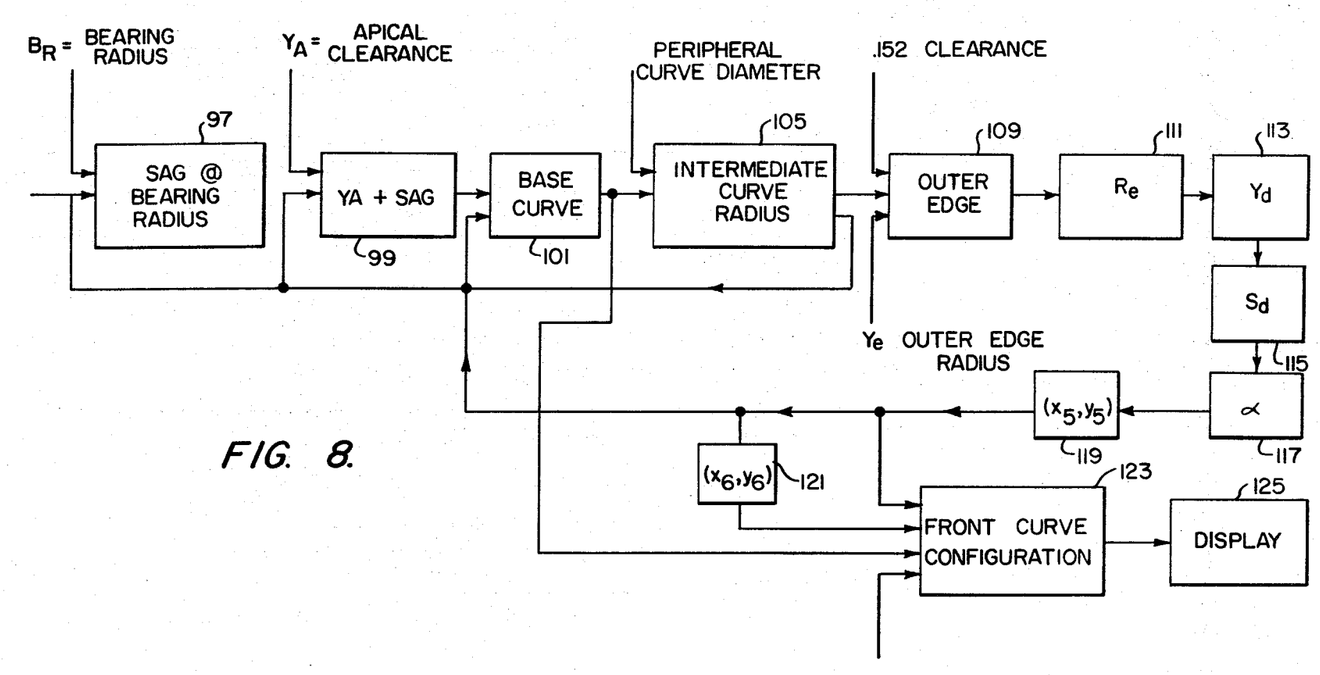
FIG. 8 is a simplified block diagram of a method and apparatus for determining the topography of the internal contour of a contact lens.

Refer now to FIGS. 6, 7 and 8 for a description of the preferred apparatus system for carrying out the subject invention. The photoelectronic keratoscope 51 is shown in block diagram form. The output of the keratoscope 51 is in the form of a film having a plurality of concentric rings thereon. It should be understood, however, that the output of the keratoscope 51 could be in the form of electrical signals or light waves or any other suitable output medium. The film is read by a film reader comparator 53 which measures the distance between the rings on the film along selected meridians. The film reader may take any suitable form but in the preferred embodiment includes a circuit which initiates the generation of a ramp function as a sensor passes a ring along a selected meridian and terminates the ramp function when the sensor reaches the next succeeding ring. The amplitude of the ramp function is proportional to the distance between the rings. This value may be digitized for digital processing or may be converted to an analog voltage for analog processing.

The output of the film reader is coupled to one of a plurality of sample and hold circuits 55–59 which are well known in the art. The gating of the sample and hold circuits is controlled by a ring counter 61 which is stepped each time the film reader reaches the next ring. Thus, the output of the film reader is sequentially stored in the sample and hold circuits as the sensor moves from ring to ring. The output of each sample and hold circuit is coupled to a circuit 63–67 for generating the arctangent $BH/XB$ which is the angle $\mu'$ as shown in FIG. 2. The value $XB$ is a constant equal to the short conjugate of the camera system. The value $BH$ is derived by multiplying the output of the sample and hold circuit by the reciprocal of the magnification factor of the photoelectronic keratoscope. Circuits for multiplying the output of the sample and hold circuit by the reciprocal of the magnification factor and for finding the arctangents of a function are well known in the art and, accordingly, are not disclosed herein in detail. The aforementioned circuits and the circuits to be described hereinafter may be either analog or digital in form. If a digital circuit, such as, an electronic computer, is utilized, the necessary programming steps for implementing the operational steps of multiplying, dividing, solving simple equations and deriving trigonometric functions as disclosed herein are well known in the art.

The outputs of each of the circuits 63–67 are coupled to adding and dividing circuits 69–73, respectively, and the output of the circuit 63 is coupled to circuit 75 which generates the vertex radius VR. The circuits 69–73 sum the respective outputs of circuits 63–67 with the angles $\mu_n$ which are known from the geometry of the target in the photoelectronic keratoscope. The signals representing the angles $\mu_n$ are fed into the circuits 69-73 from an external source not shown. The sum of the angles $\mu'_n$ and $\mu_n$ are then divided by 2 to give the angle $\phi_n$, which as shown in FIG. 2, are the angles between the incident target rays and the radius from the intercept O to the point on the cornea from which the ray is reflected.

In circuit 75, the sine function of the angles $\mu_1$ and $\mu_1'$ are first derived. Next circuit 75 divides the sine of the angle $\mu_1'$ by the sine of the angle $\phi_1$. The quotient is then multiplied by a signal representing the distance OX which is a constant dependent upon the design of the photoelectronic keratoscope 51. The resulting signal represents the vertex radius VR which extends from the vertex point C to the point where the normal to the surface at the vertex intercepts the axis OX as shown in FIG. 2.

This signal is coupled to each of the circuits 77-81 which generate the semi-chords $C(1)$ to $C(n)$. The other input to each of the circuits 77-81 is derived from the circuits 69-73, respectively. The circuits 79-81 generate the sine of the angles $\phi_1$ to $\phi_n$, respectively, and multiplying the sine function values by the signal representing the vertex radius to give the semi-chord lengths $C(1)$ to $C(n)$. At the same time, the angles $\psi_1$ to $\psi_n$ are computed by circuits 83-87. These circuits subtract the angles $\mu_n'$ from $\mu_n$. This result is divided by 2 to derive the angles $\psi_1$ to $\psi_n$, respectively.

Circuits 89-93 compute the sagittal depths $S(1)$ to $S(n)$ between each chord $C(1) - C(n)$. Thus, for example, circuit 89 computes the sagittal distance from the apex of the cornea to the first chord $C(1)$. The tangent of one-half of the angle $\psi_1$ which is the output of circuit 83 is first derived by means known in the art. Then this value is multiplied by the semichord $C(1)$ to give the sagittal distance $S(1)$. The sagittal distance $S(2)$ is generated by circuit 92 which sums the outputs of circuits 83 and 85 which outputs represent the angle $\psi_1$ and $\psi_2$. This value is divided by 2 to give $(\psi_1 + \psi_2)/2$. The tangent of this angle is then derived. At the same time, the semi-chordal distance $C(1)$ is subtracted from the distance $C(2)$, the signals representing $C(1)$ and $C(2)$ being derived from the outputs of circuits 77 and 79, respectively. The sagittal distance $S(2)$ is thus computed by multiplying the signals representing $[C(2) + C(1)]$ and $\tan[(\psi(1) + \psi(2)/2]$.

Each of the computed sagittal distances and semi-chord lengths are fed to a computer 95 which preferably is of the digital type. The computer is programmed to generate the equation of the ellipse which best fits the points defined by the semi-chords $C(1)$ to $C(n)$ and the sagittal distances therebetween $S(1)$ to $S(n)$. Methods of generating a curve to fit a plurality of points are known in the art. An example of one such method is the Gauss-Sidell method which is disclosed in Numerical Method and Fortran Programming by McCracken and Dorn. The coefficients of the general quadratic equation found by this solution are used to compute the location of the points on the cornea for the purpose of designing the interior of the contact lens.

Circuit 97 shown in FIG. 8 computes the sagittal distance $S(b)$ from the apex of the corneal curve to the point at which the chord representing the bearing zone diameter intercepts the major axis. As aforementioned, the bearing zone diameter is derived by subtracting a fixed distance from the outer diameter of the lens. The signal representing the bearing zone diameter is divided by two to give the semi-chordal distance to the junction of the optical zone and the bearing zone. This distance is the y axis coordinate $y_2$ of the junction. The x axis coordinate $x_c$ is derived by substituting the value $y_2$ into the derived corneal equation. This operation may be preformed, for example, by an appropriately programmed computer. Thus, two points on the base curve are known, namely, $(x_2, y_2)$ and $(x_2, -y_2)$.

Another point on the base curve can be determined since the apex of the base curve is on the x axis at a distance from the origin equal to the apical clearance. This coordinate, i.e., $(x_1, y_1)$ is determined by circuit 99. With three points on the base curve known, the radius of the curve along with the coordinates of its center point can be determined by simultaneous solution of the following equations:

$$(x_1 - X_c)^2 + (y_1 - Y_c)^2 = R^2 \quad (15)$$
$$(x_2 - X_c)^2 + (y_2 - Y_c)^2 = R^2 \quad (16)$$
$$(x_2 - X_c)^2 + (-y_2 - Y_c)^2 = R^2 \quad (17)$$

These equations are solved by circuit 101 which may be a digital computer programmed according to methods well known to those skilled in the art. With the base curve radius and the position thereof determined, the base curve of the optical zone of the contact lens is defined.

Next the intermediate curve which covers the bearing zone of the lens is developed. The inner radius of the peripheral zone is found by subtracting a fixed distance, usually 6 mm from half the lens diameter. This distance is the distance from the major axis to the point of intersection of the intermediate curve and the peripheral curve. From the value of the radius, the y axis coordinate $y_3$ of this point is known. The x axis coordinate $x_3$ can be computed by substituting the y axis value $y_3$ into the derived corneal equation and solving for x. This is accomplished by computer circuit 101 which is appropriately programmed by known techniques. If it is desired to have the outer edge of the intermediate curve raised from the corneal curve, a constant value, e.g., 0.005 mm, may be subtracted from the derived sagittal distance $x_3$ to provide a new x axis coordinate $x_3'$. However, for purposes of the description, it will be assumed that the outer edge of the peripheral curve is parallel to the corneal curve. Three points $(x_4, y_4)$ $(x_6, -y_4) + (x_5, y_5)$ on the intermediate curve are now known. By the equations 15, 16, and 17, the radius of the intermediate curve and the coordinates of its center can be computed by circuit 101 thus defining the intermediate curve.

Next, the peripheral curve is developed. The overall diameter of the lens if predetermined and, accordingly, the radius thereof represented by the semi-chord $y_e$ as shown in FIG. 5 can be derived by dividing the diameter of the lens by two. The sagittal distance from the apex of the corneal curve to the point where the semi-chord intersects the corneal curve is then computed by substituting the value $y_e$ into the y variable of the equation of the corneal curve. By solving the equation, the x axis coordinate is given. Thus, the x and y coordinates of the intercept are determined. This is accomplished by computer circuit 101.

Next equation (9) is solved by the circuit of block 109 to give the slope at this point. The corneal radius $R_e$ at this point can then be computed by the following equation:

$$R_e = Y_e/\cos \beta \quad (18)$$

where $\beta$ is the angle between the radius $R_e$ and the cord $y_e$ and is determined by deriving the arctangent of the slop given by equation 109. The derivation of the angle $\beta$ and the corneal radius $R_e$ is accomplished by circuit 111.

Next, the semi-chord $y_d$ to the intersection of the normal from the corneal curve to the outer edge point E is computed in accordance with equation (10) by circuit 113. The sagittal distance from the apex of the ellipse to the point on the corneal curve where the semi-chord $y_d$ meets the curve is computed by circuit 115 by substituting the value $y_d$ into the derived equation for the corneal curve. Thus point D on the corneal curve from which the edge thickness t is measured is now known. The angle $\alpha$ which the normal to the ellipse at point D makes with the major axis is derived in circuit 117 by equation (15). At this point the $x$ and $y$ axis coordinates of the point P, i.e., $(x_5, y_5)$ on the inner surface of the peripheral curve can be determined according to equations (12) and (13), respectively, by means of circuit 119, which is an appropriately programmed computer circuit. The radius of the peripheral curve can now be computed by circuit 101 by substituting the points $(x_4, y_4)$ $(x_4, -y_4) + (x_5, y_5)$ into equations 15, 16, and 17.

With the three curves forming the inner surface of the contact lens having been developed by computing their associated radii, only the front surface of the lens remains to be developed.

The coordinates $(x_6, y_6)$ of the outer edge of the front surface E are determined by circuit 121. The $y$ axis coordinate is set equal to the semi-chord $y_e$ while the $x$ axis coordinate is computed in accordance with equation (14).

The front surface of the lens can now be derived. The desired power P of the lens if given by the practioner in Diopters and the index of refraction N of the lens material is known. The outer base radius $R_o$ may be calculated from the known base radius $B$, the known power $P$, and the thickness $t$ which must be determined by the following equation:

$$R_o = A B/(PB + A) + Ct \qquad (19)$$

where $A = 1000(N-1)$ and $C=(N-1)N$. This equation includes the value of the lens thickness $t$ which is an unknown quantity. The distance $S_e$ parallel to the axis $OX$ from the apex of the cornea to the outer edge E in FIG. 4 is known. The distance from the apex of the outer or front surface curve to the point E can be found from the following equation:

$$S_o = R_o - \sqrt{R_o^2 - y_e^2} \qquad (20)$$

and the thickness $t$ is given by $$t = S_o - S_e - C_a \qquad (21)$$

where $C_a$ is the apical clearance.

In computing $R_o$ an initial value which may for example, be zero, is assumed for $t$ and a preliminary value is found for $R_o$ from equation (19). This value of $R_o$ is used to find a new value for $t$ from equations (20) and (21). This value of $t$ will not agree with the initially assumed value for $t$. The new value for $t$ is substituted in equation (19) and equations (19) through (21) are again solved. The new value of $t$ is again substituted into equation (19) and the equations (19) through (21) are again solved. With each succeeding solution of the equations, the change in the value of $t$ will become increasingly smaller. When the change becomes satisfactorily small, the process is completed and the value $R_o$ of the outer radius which defines the front surface is determined. These computations are preformed by circuit 123.

After the inner contour of the lens has been defined by the base, intermediate and peripheral radii and the outer contour has been defined by radus $R_o$ which depends on the prescription, the lens is produced by the usual grinding techniques and equipment known and used in the art. One simply need use the aforementioned radii to form all the desired dimensions of the lens. It should be understood that the radii could be used to control a grinding machine such that the lens is automatically ground to conform to curves defined by the radii.

While the invention has been described in connection with a preferred embodiment, it is not intended to limit the invention to the particular form set forth, but, on the contrary, it is intended to cover such alternatives, modifications, and equivalents as may be included within the spirit and scope of the invention as defined by the appended claims.

What is claimed is:

1. In a method of producing a corneal contact lens, said lens having an optical zone defined by a base curve, a bearing zone defined by an intermediate curve, and a peripheral zone defined by a peripheral curve, the method comprising the steps of generating a curve which best defines the contour of the patient's cornea, said generating step comprising the steps of directing light from a series of target rings onto the cornea of the eye, reflecting said light from said cornea, said reflected light including rings of light spaced from one another according to the topography of said cornea, measuring the distance between said rings of light along at least one meridian, converting said distances into points substantially defining the intersection of said meridian and said rings of light on said cornea, and generating the curve which best fits said points, and developing the base, intermediate and peripheral curves of said contact lens which best fit said generated curve, said base curve being developed by deriving at least three points which define said base curve, two of said points being at the intersection of the generated curve and the chord representing the bearing diameter of said lens, another of said points being at a distance equal to the apical clearance from the apex of the generated curve, said intermediate curve being developed by deriving at least one point on the outer edge of said intermediate curve, said point being at a distance from the axis of said generated curve equal to the peripheral radius, and said peripheral curve being developed by deriving a point outside of said bearing zone having a predetermined distance from said generated curve.

2. The method of claim 1 wherein said peripheral curve developing step further comprises the steps of determining the point on said generated curve where the line normal to the generated curve which passes through the outer edge of the front of the lens intercepts the generated curve, deriving the angle that said normal makes with the major axis of said generated curve, and deriving said point on the inner surface of said peripheral curve, said point being a predetermined distance from said point on said generated curve through which said normal passes.

3. The method of claim 2 further comprising the step of recording the rings of light reflected from said cornea.

4. The method of claim 3 including the step of solving three simultaneous equations of a circle for the radii and their center points of the base, intermediate and peripheral curves in developing the base, intermediate and peripheral curves.

5. The method of claim 1 further comprising the step of generating a curve defining the front surface of said lens, wherein said lens has a prescribed power, said front curve generating step comprising the steps of determining at least two points on the outer edge of the front surface of said lens, said points being a predetermined distance from said corneal surface, and determining the thickness of said lens at the apex thereof such that the front surface of the lens is a portion of a sphere passing through said outer edge points with said lens having said prescribed power.

6. In a system for producing a corneal contact lens, said lens having an optical zone defined by a base curve, a bearing zone defined by an intermediate curve, and a peripheral zone defined by a peripheral curve, the system comprising apparatus means for generating a curve which best defines the contour of the patient's cornea, said generating means comprising means for directing light from a series of target rings onto the cornea of the eye, said light being reflected from said cornea in the form of rings of light spaced from one another according to the topography of said cornea, means for measuring the distance between said rings of light along at least one meridian, means for converting said distances into points substantially defining the intersection of said meridian and said rings of light on said cornea, and means for generating the curve which best fits said points; means for developing the base, intermediate and peripheral curves of said contact lens which best fit said generated curve, said means including means for deriving at least three points which define said base curve, two of said points being at the intersection of the generated curve and the chord representing the bearing diameter of said lens, another of said points being at a distance equal to the apical clearance from the apex of the generated curve, means for deriving at least one point on the outer edge of said intermediate curve, said point being at a distance from the axis of said generated curve equal to the peripheral radius, and means for deriving a point outside of said bearing zone having a predetermined distance from said generated curve.

7. The system of claim 6 wherein said means deriving said point on said peripheral curve comprises means for determining the point on said generated curve where the normal to the generated curve which passes through the outer edge of the front of said lens intercepts the generated curve, means for deriving the angle that said normal makes with the major axis of said generated curve, and means for deriving a point on said intermediate curve, said point being a predetermined distance from said point on said generated curve.

8. The system of claim 7 further comprising means for recording the rings of light reflected from said cornea.

9. The system of claim 8 wherein said light direction means is a photoelectronic keratometer, said keratometer having a series of target rings positioned to give a flat image plane when said light is reflected from said cornea.

10. The system of claim 9 wherein said means for developing the base, intermediate and peripheral curves includes means for solving three simultaneous equations of a circle for the radii and their center points of the base, intermediate and peripheral curves.

* * * * *